United States Patent
Couper et al.

(10) Patent No.: US 10,255,795 B2
(45) Date of Patent: Apr. 9, 2019

(54) AUDIO DETECTION USING DISTRIBUTED MOBILE COMPUTING

(71) Applicant: International Business Machines Corporation, Armonk, NY (US)

(72) Inventors: Christopher C. Couper, Shingle Springs, CA (US); Neil A. Katz, Parkland, FL (US); Victor S. Moore, Gainesville, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/135,220

(22) Filed: Sep. 19, 2018

(65) Prior Publication Data

US 2019/0019400 A1   Jan. 17, 2019

Related U.S. Application Data

(63) Continuation of application No. 14/853,058, filed on Sep. 14, 2015, now Pat. No. 10,102,737, which is a
(Continued)

(51) Int. Cl.
*G10L 15/00* (2013.01)
*G10L 21/00* (2013.01)
(Continued)

(52) U.S. Cl.
CPC ....... *G08B 25/016* (2013.01); *G08B 13/1672* (2013.01); *G08B 25/08* (2013.01);
(Continued)

(58) Field of Classification Search
CPC ........ G08B 21/0211; G08B 21/0202; G08B 21/02; G08B 25/016; G08B 25/08;
(Continued)

(56) References Cited

U.S. PATENT DOCUMENTS

| 5,787,399 A | 7/1998 | Lee et al. |
| 6,012,030 A | 1/2000 | French-St. George et al. |

(Continued)

FOREIGN PATENT DOCUMENTS

| WO | 02075688 A2 | 9/2002 |
| WO | 2004079395 A2 | 9/2004 |

(Continued)

OTHER PUBLICATIONS

WIPO Appln. PCT/EP2007/061990, International Search Report, dated Jul. 24, 2008, 4 pg.

(Continued)

*Primary Examiner* — Hoi C Lau
(74) *Attorney, Agent, or Firm* — Cuenot, Forsythe & Kim, LLC

(57) ABSTRACT

A method of identifying incidents using mobile devices can include receiving a communication from each of a plurality of mobile devices. Each communication can specify information about a detected sound. Spatial and temporal information can be identified from each communication as well as an indication of a sound signature matching the detected sound. The communications can be compared with a policy specifying spatial and temporal requirements relating to the sound signature indicated by the communications. A notification can be selectively sent according to the comparison.

4 Claims, 2 Drawing Sheets

Related U.S. Application Data continuation of application No. 11/616,973, filed on Dec. 28, 2006, now Pat. No. 9,135,797.

(51) Int. Cl.

| | | |
|---|---|---|
| *H04R 5/00* | (2006.01) | |
| *G08B 25/01* | (2006.01) | |
| *G10L 15/20* | (2006.01) | |
| *G10L 21/0208* | (2013.01) | |
| *G08B 13/16* | (2006.01) | |
| *G08B 25/08* | (2006.01) | |
| *G08B 25/10* | (2006.01) | |
| *H04R 5/027* | (2006.01) | |
| *H04R 5/04* | (2006.01) | |

(52) U.S. Cl.
CPC .............. *G08B 25/10* (2013.01); *G10L 15/00* (2013.01); *G10L 15/20* (2013.01); *G10L 21/00* (2013.01); *G10L 21/0208* (2013.01); *H04R 5/00* (2013.01); *H04R 5/027* (2013.01); *H04R 5/04* (2013.01)

(58) Field of Classification Search
CPC ....... G08B 25/10; B60C 23/009; B60C 23/06; G10L 21/00; G10L 21/0208; G10L 15/00; G10L 15/20
USPC ....... 340/540, 539.13, 565, 621, 517, 573.4, 340/539.11; 704/231, 236–240, 243–250, 704/270, 273–274, E17.001–E17.016, 704/E15.001–E15.05, E11.001–E11.007; 381/20, 56
See application file for complete search history.

(56) References Cited

U.S. PATENT DOCUMENTS

| | | | |
|---|---|---|---|
| 6,028,514 A | | 2/2000 | Lemelson et al. |
| 6,069,594 A | | 5/2000 | Barnes et al. |
| 6,091,327 A | | 7/2000 | Heed et al. |
| 6,246,320 B1 | | 6/2001 | Monroe |
| 6,281,792 B1 | | 8/2001 | Lerg et al. |
| 6,288,641 B1 | | 9/2001 | Casais |
| 6,288,643 B1 | | 9/2001 | Lerg |
| 6,459,371 B1 | | 10/2002 | Pike |
| 6,538,623 B1 | | 3/2003 | Parnian et al. |
| 6,600,417 B2 | | 7/2003 | Lerg |
| 6,857,312 B2 | | 2/2005 | Choe et al. |
| 6,888,455 B2 | * | 5/2005 | Lerg ................. B60C 23/06 340/385.1 |
| 6,961,002 B2 | | 11/2005 | Lerg |
| 6,965,312 B2 | * | 11/2005 | Lerg ................. G08B 1/08 340/539.13 |
| 7,333,395 B2 | * | 2/2008 | Lewis ................. A01K 79/02 367/139 |
| 7,929,720 B2 | | 4/2011 | Ishibashi et al. |
| 9,037,728 B2 | * | 5/2015 | Bai ................. H04W 8/005 455/456.1 |
| 9,094,453 B2 | * | 7/2015 | Ady ................. H04W 4/21 |
| 9,135,797 B2 | * | 9/2015 | Couper ............. G08B 13/1672 |
| 10,102,737 B2 | * | 10/2018 | Couper ............. G08B 13/1672 |
| 2002/0003470 A1 | * | 1/2002 | Auerbach ............. F41H 11/00 340/425.5 |
| 2002/0023020 A1 | * | 2/2002 | Kenyon ................. G06Q 30/02 704/231 |
| 2002/0026311 A1 | * | 2/2002 | Okitsu ................. G10L 15/26 704/201 |
| 2002/0107694 A1 | * | 8/2002 | Lerg ................. B60C 23/06 704/273 |
| 2003/0040903 A1 | | 2/2003 | Greson |
| 2003/0069002 A1 | * | 4/2003 | Hunter ................. G09F 27/00 455/404.2 |
| 2003/0069727 A1 | | 4/2003 | Krasny et al. |
| 2003/0119523 A1 | | 6/2003 | Bulthuis |
| 2003/0194350 A1 | | 10/2003 | Stamatelos et al. |
| 2003/0214405 A1 | | 11/2003 | Lerg |
| 2004/0036602 A1 | * | 2/2004 | Lerg ................. B60C 23/06 340/540 |
| 2004/0070515 A1 | | 4/2004 | Burkley et al. |
| 2004/0107104 A1 | | 6/2004 | Schaphorst |
| 2004/0119591 A1 | | 6/2004 | Peeters |
| 2004/0192384 A1 | | 9/2004 | Anastasakos et al. |
| 2005/0105743 A1 | | 5/2005 | Faltesek |
| 2005/0225443 A1 | * | 10/2005 | Lerg ................. G08B 1/08 340/539.13 |
| 2005/0239511 A1 | | 10/2005 | Boillot |
| 2006/0044142 A1 | * | 3/2006 | Korneluk ........... G08B 21/0272 340/573.4 |
| 2006/0059277 A1 | * | 3/2006 | Zito ................. G06Q 30/02 710/15 |
| 2006/0210101 A1 | | 9/2006 | Ishibashi et al. |
| 2006/0217990 A1 | * | 9/2006 | Theimer ............. G06F 17/30038 707/769 |
| 2006/0256660 A1 | | 11/2006 | Berger |
| 2007/0016918 A1 | * | 1/2007 | Alcorn ............. G06F 17/30743 725/22 |
| 2007/0183604 A1 | * | 8/2007 | Araki ................. G10L 17/26 381/58 |
| 2008/0162133 A1 | * | 7/2008 | Couper ............. G08B 13/1672 704/239 |
| 2009/0055170 A1 | | 2/2009 | Nagahama |
| 2012/0170412 A1 | * | 7/2012 | Calhoun ............. G01S 3/8083 367/118 |
| 2012/0182837 A1 | * | 7/2012 | Calhoun ............. G01S 5/20 367/127 |
| 2013/0317669 A1 | * | 11/2013 | Jiang ................. G01S 3/80 701/3 |
| 2014/0018097 A1 | * | 1/2014 | Goldstein ............. G06F 19/00 455/456.1 |
| 2015/0123807 A1 | * | 5/2015 | Wichner ............. G08B 21/182 340/686.1 |
| 2015/0127710 A1 | * | 5/2015 | Ady ................. H04W 4/21 709/202 |
| 2016/0005305 A1 | | 1/2016 | Couper et al. |

FOREIGN PATENT DOCUMENTS

| | | |
|---|---|---|
| WO | 2005093680 A1 | 10/2005 |
| WO | 2008080673 A2 | 7/2008 |

OTHER PUBLICATIONS

WIPO Appln. PCT/EP2007/061990, International Preliminary Report on Patentability and Written Opinion, dated Jun. 30, 2009, 6 pg.

U.S. Appl. No. 11/616,973 Non-Final Office Action, dated Nov. 19, 2009, 13 pg.

U.S. Appl. No. 11/616,973 Final Office Action, dated May 13, 2010, 13 pg.

U.S. Appl. No. 11/616,973 Non-Final Office Action, dated Dec. 27, 2010, 14 pg.

U.S. Appl. No. 11/616,973 Final Office Action, dated Jun. 7, 2011, 20 pg.

U.S. Appl. No. 11/616,973 Examiners Answer to Appeal Brief, dated Dec. 2, 2011, 29 pg.

U.S. Appl. No. 11/616,973 Decision on Appeal, dated Feb. 12, 2015, 11 pg.

U.S. Appl. No. 11/616,973 Notice of Allowance, dated May 4, 2015, 7 pg.

U.S. Appl. No. 14/853,058, Non-Final Office Action, dated Aug. 24, 2017, 8 pg.

U.S. Appl. No. 14/853,058, Notice of Allowance, dated Jun. 6, 2018, 8 pg.

* cited by examiner

AUDIO DETECTION USING DISTRIBUTED MOBILE COMPUTING

BACKGROUND OF THE INVENTION

Some municipalities have come to rely upon sound detection as a tool for crime prevention. Fixed-location audio sensors are distributed throughout a geographic area, such as a neighborhood, a town, or a city. The audio sensors are networked with a central processing system. The central processing system continually monitors the sounds provided by the various sensors to determine whether any detected sound is indicative of a potential crime.

Audio provided from the sensors to the central processing system is compared with signatures of various sounds. For example, audio from the sensors can be compared with signatures for gunshots, breaking glass, or the like. If a portion of audio matches the signature of one, or more, of the sounds, the central processing system can determine that the event, e.g., a gunshot, a window being broken, likely happened in the vicinity of the sensor that sent the audio.

When such a sound is detected, a response team can be dispatched to the location at which the sound was detected. While this sort of system has been successfully used to reduce crime, it can be costly to deploy. The system requires the installation of specialized audio sensors and networking equipment throughout a geographic area. The cost of installing the audio sensors alone can be significant even before the other components of the system are considered.

BRIEF SUMMARY OF THE INVENTION

The present invention relates to a method of identifying incidents using mobile devices. A communication from each of a plurality of mobile devices can be received. Each communication can specify information about a detected sound. Spatial and temporal information can be identified from each communication as well as an indication of a sound signature matching the detected sound. The communications can be compared with a policy specifying spatial and temporal requirements relating to the sound signature indicated by the communications. A notification can be selectively sent according to the comparison.

The present invention also relates to a method of identifying incidents using mobile devices including receiving a communication from each of a plurality of mobile devices. The communications can be compared with a validation policy. A notification can be selectively sent according to the comparison.

The present invention also relates to a computer program product including a computer-usable medium having computer-usable program code that, when executed by an information processing system, performs the various steps and/or functions disclosed herein.

DETAILED DESCRIPTION OF THE INVENTION

Figure 1:
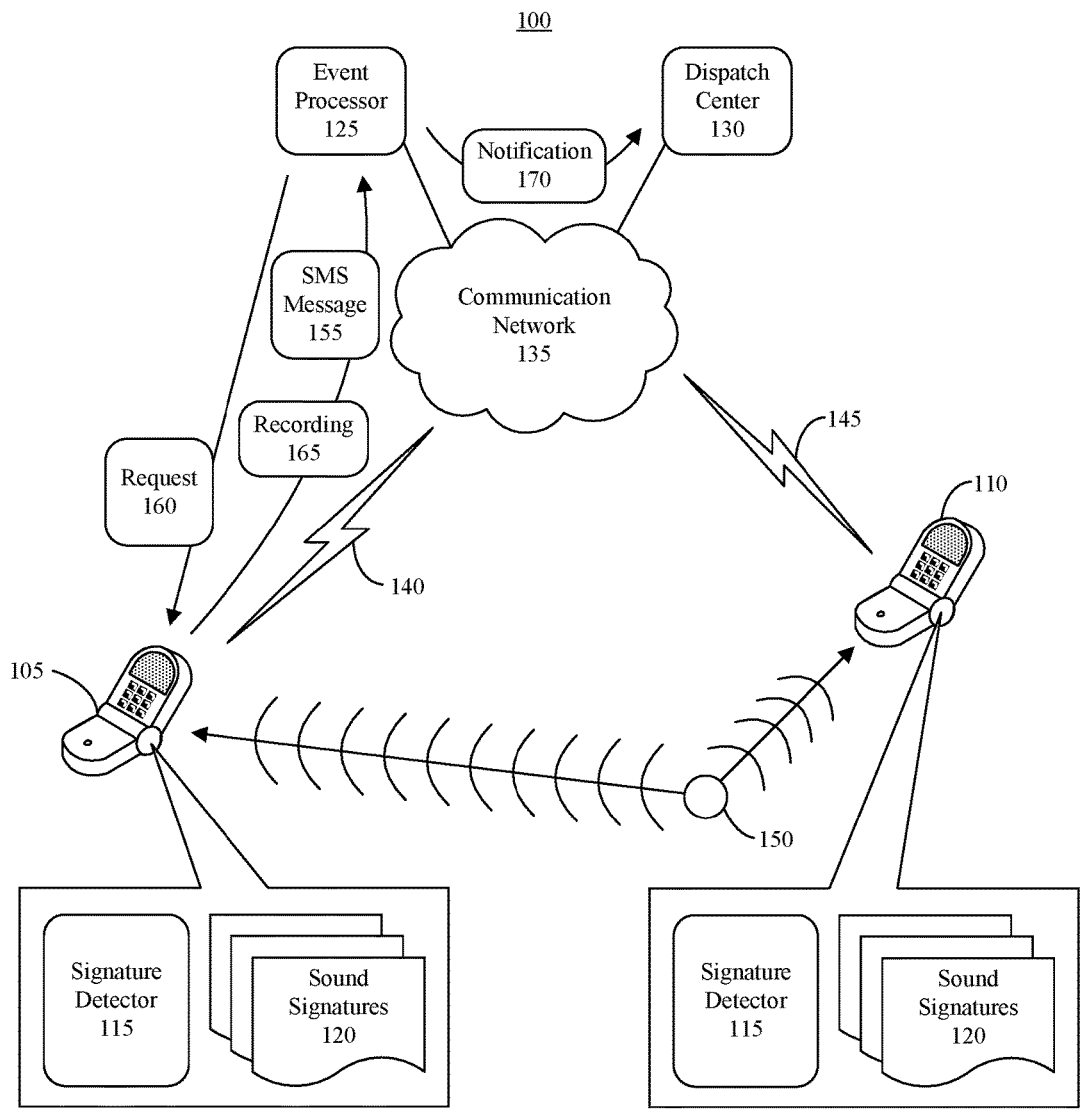
FIG. 1 is a block diagram illustrating a system in accordance with one aspect of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit", "module", or "system".

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention relates to detecting sounds that are indicative of incidents including, but not limited to, crime, safety hazards, terrorist threats, or any other event for which a response team may be dispatched or needed. Mobile devices can be loaded with audio analysis software that can recognize particular sounds. This allows the mobile devices to be leveraged throughout a geographic area as sound sensors using the built in audio detection capabilities of the mobile devices. Upon detecting a selected sound, the mobile device can send a communication to an event processor. The communication can specify information relating to the detected sound.

The event processor can evaluate communications received from one or more mobile devices to determine or validate whether an incident associated with the detected sounds has occurred or is occurring. If the information identified from the communications conforms to predetermined criteria, for example, as specified within an incident validation policy, the event processor can take further action. For example, the event processor can provide a notification to an emergency services dispatch center indicating a given sound or incident has been detected.

FIG. 1 is a block diagram illustrating a system 100 in accordance with one aspect of the present invention. The system 100 can include a plurality of mobile devices 105 and 110, an event processor 125, as well as a dispatch center 130. The mobile devices 105 and 110, the event processor 125, and the dispatch center 130 can be communicatively linked via the communication network 135.

The communication network 135 can be implemented as, or include, without limitation, a WAN, a LAN, the Public Switched Telephone Network (PSTN), the Web, the Internet, and one or more intranets. The communication network 135 further can include one or more wireless networks, whether short or long range. For example, in terms of short range wireless networks, the communication network 135 can include a local wireless network built using Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 135 can include a mobile, cellular, and or satellite-based wireless network and support voice, video, text, and/or any combination thereof, e.g., GSM, TDMA, CDMA, and/or WCDMA network.

The mobile devices 105 and 110 can be implemented as mobile phones, personal digital assistants, or any other device capable of sending and receiving data over wireless communication links 140 and 145 via the communication network 135. For example, each of the mobile devices 105 and 110 can include a microphone, a processor, and memory. The mobile devices 105 and 110 further can include a wireless transceiver capable of establishing the wireless communication links 140 and 145 with the communication network 135. The wireless transceiver can support one or more of the various communication protocols noted herein, though the present invention is not intended to be limited by the type of communication scheme or channel used.

The mobile devices 105 and 110 can include a signature detector 115 and one or more sound signatures 120. The signature detector 115 can be a computer program that is executed by each respective mobile device 105 and 110. The signature detector 115 can cause each mobile device 105 and 110 to perform the various functions to be described herein. In one embodiment, the mobile devices 105 and 110 can be shipped with the signature detector 115 and the sound signatures 120. In another embodiment, the signature detector 115 and/or the sound signatures 120 can be installed on the mobile devices 105 and 110 at some other point in time, for example, after purchasing the device by downloading the computer programs and data via a wireless connection. In this regard, it should be appreciated that additional sound signatures 120 can be downloaded over time and that existing sound signatures 120 can be updated and/or deleted. The signature detector 115 also can be updated in this manner.

In general, the signature detector 115 can compare audio that is received by the internal microphone of the mobile device 105 with the sound signatures 120. The sound signatures 120 are audio profiles of sounds that have been determined to be indicative of an incident. For example, the sound signatures 120 can specify audio profiles for sounds including, but not limited to, gunshots, explosions, sirens, alarms, breaking glass, auto accidents, yelling or screaming, calls for help, etc. The potential range of audio events for which a sound signature 120 can be included in a mobile device is limited only by the available memory or storage capacity of the respective mobile device.

The signature detector 115 can extract information from the detected sound and compare that information to the sound signatures 120. Examples of the sort of data that can be extracted or determined from the detected sound can include, but are not limited to, volume or sound-pressure-level information, the frequency range of the detected sound, the amount of energy detected in different frequency bands of interest, a spectrum analysis, transient characteristics, the actual waveform of the detected sound, a Fourier Transform or FFT information, formant information, or the like. These parameters further can be measured over time. The various parameters listed herein are intended as examples only and, as such, are not intended to limit the present invention in any way.

In addition to comparing received, or detected, sounds with the sound signatures 120, the signature detector 115 can control one or more other functions of the mobile devices 105 and 110. For example, the signature detector 115 can cause the mobile devices 105 and 110 to keep the microphone active so that sounds are continually monitored, recorded, and compared with the stored sound signatures 120. The mobile devices 105 and 110 further can communicate with the event processor 125 under the control of the signature detector 115, interpret communications received from the event processor 125, as well as respond to requests from the event processor 125, such as providing recorded audio.

The event processor 125 can be implemented as an information processing system executing suitable operational software, e.g., a server. The event processor 125 can receive information from the mobile devices 105 and 110, analyze that information, and based upon the analysis, contact the dispatch center 130. The event processor 125 further can query the mobile devices 105 and 110 for additional information as described herein.

The dispatch center 130 can include any of a variety of communication systems capable of receiving information from the event processor 125. The dispatch center 130, for example, can be a police dispatch center, an emergency services dispatch center, 911 call center, or the like. The dispatch center 130 can be any sort of facility that is linked with the event processor 125 that, for example, can dispatch resources to address an incident detected using the mobile devices 105 and 110.

In operation, the mobile devices 105 and 110 can detect an audio event, or sound, 150. The signature detector 115 within each respective mobile device 105 and 110 can process the detected sound 150 and compare the sound 150 against the sound signatures 120 stored within the mobile devices 105 and 110. It should be appreciated that as the location of each mobile device 105 and 110 will be different, the characteristics of the detected sound 150, e.g., volume, frequency range, and the like, may differ as well, particularly if one or both of the mobile devices 105 and 110 is in motion.

In any case, each mobile device 105 and 110 can detect the sound 150 independently of the other and perform its own independent analysis. If the signature detector 115 within either one or both of mobile devices 105 and 110 can determine that the sound 150 matches a sound signature 120, a communication can be sent to the event processor 125 from that mobile device. It should be appreciated that since each mobile device 105 and 110 performs its own analysis, mobile device 105 may determine that the sound 150 matches a sound signature 120, while mobile device 110 determines that the sound 150 does not match any sound signatures 120 or possibly a different sound signature 120. Such can be the case, as noted, due to distance, motion, or the possibility that one mobile device is located in a noisy environment, while the other is not.

While mobile device 105 is depicted as being in communication with the event processor 125, it should be appreciated that communication device 110 also can conduct the same sort of information exchange with the event processor 125 as is described herein with respect to communication device 105. Further, though only two mobile devices are shown, it should be appreciated that many more mobile devices can detect the sound 150 and perform the various processing functions disclosed herein. Such mobile devices also can communicate with the event processor 125. The present invention lends itself to having many mobile devices, dispersed throughout an area and potentially in motion, continually detecting sounds.

Upon determining that the sound 150 matches a sound signature 120, the mobile device 105 can send a communication to the event processor 125. In one embodiment, the communication can be a Short Message Service (SMS) message 155. The communication can provide one or more items of information relating to the detected sound 150. For example, one or more parameters of the detected sound 150 that may be determined or extracted for comparison with the sound signatures 120 can be sent. Other data generated by the signature detector 115 also can be sent such as, for instance, a measure of how closely the sound 150 matches the sound signature 120. The information sent within the communication, i.e., SMS message 155, can include any information determined by the signature detector 115 and, in one embodiment, initially exclude any audio that have been recorded or collected by the mobile device 105.

Spatial information, such as the location of the mobile device 105 when the sound 150 is detected can be included in the communication. Such information can be determined through conventional mobile triangulation techniques, using a Global Positioning System (GPS) receiver included in the mobile device 105, or the like. Regardless of how location information is ascertained, spatial information can be determined by the mobile device 105 and inserted into the communication. Temporal information, e.g., a timestamp specifying the time of day and the date, when the sound 150 is detected also can be specified within the communication. Further, an identifier capable of uniquely specifying the particular sound signature 120 that was matched to the sound 150 can be included in the communication.

The event processor 125 can receive communications, such as SMS 155, from any mobile device that detects the sound 150, or any other sound matching a sound signature 120, for that matter. The event processor 125 can analyze the received information from the various mobile devices and compare that information with an incident validation policy to determine when a valid incident has taken place or is taking place.

The event processor 125 can be programmed to identify communications corresponding to a same detected sound. In some cases, the sound signatures indicated by such messages will be the same. Further, the temporal and spatial information indicated by the communications will be close. That is, the mobile devices that detected the sound 150 will have been located within a predetermined distance of one another as determined from the spatial information in the communications from each respective mobile device. Further, the time at which each mobile device detected the sound 150 will have been within a predetermined amount of time of one another as determined from the temporal information specified within the communications.

It should be appreciated the interpretation of spatial and temporal information can vary according to the particular sound signatures that are detected. The temporal and/or spatial constraints used to interpret data received from mobile devices can vary according to the particular sound signatures detected. This can be specified as part of the validation policy, for example.

In illustration, if two mobile devices detect glass breaking, but are located more than a mile apart when the sound is detected, the event processor can determine that the mobile devices detected two separate instances of glass breaking. The same can be determined from temporal information, e.g., if two detections of glass breaking occur more than 5 or 10 seconds apart, the two detections can be interpreted as separate incidents of glass breaking. If, however, an explosion is detected by two mobile devices located approximately one mile apart, the event processor can apply different spatial constraints and determine that one explosion likely occurred, but was detected by two mobile devices.

In some cases, however, the two mobile devices 105 and 110 may detect the same audio event, but interpret the audio event differently. One mobile device, for example, can match the audio event with an incorrect sound signature 120. In that case, the event processor 125 can determine that the audio events are either the same audio event or are at least related, for example, if the audio events were detected by each respective mobile device within a predetermine amount of time of one another and the mobile devices that detected the audio event were within a predetermined distance of one another. In such cases, the event processor 125 can determine that one of the devices interpreted the detected sound incorrectly. Again, the rules applied can vary according to the particular sound signatures detected.

In other cases, the event processor 125 can determine that the sounds are actually different, but likely relate to a same incident. For example, mobile device 105 detects glass breaking and mobile device 110 detects a siren. If both devices detect the sounds within a predetermine amount of time of one another and are located within a predetermined distance of one another, the event processor 125 can determine that although two different audio events are detected, the audio events are indicative of a single incident, e.g., a burglary.

The communications can be compared with a policy that determines when, and under what circumstances, a notification 170 can be provided to the dispatch center or that a valid incident is or has occurred. For example, the validation policy can specify a minimal number of communications (mobile devices) that must detect a particular sound signature before a valid incident is determined to have occurred and a notification 170 is sent. The validation policy further can specify a minimal confidence score that the event processor 125 must calculate from information specified within the communications to determine that a valid incident has occurred. The policy further can specify spatial and/or location proximity guidelines for sound detections by multiple mobile devices that are indicative of a valid incident or indicate that multiple sounds relate to a same incident.

In one embodiment, the event processor can directly send the notification 170 to the dispatch center. In another embodiment, the event processor 125 can send a request 160 to the mobile device 105 asking for recorded audio of the detected sound 150. The request 160 can be formatted and/or sent as any of a variety of different communication, e.g., an SMS message. In one aspect, the validation policy can specify when further information is to be requested from a mobile device 105 or 110.

The mobile device 105 can send a recording 165 of the detected sound over the voice channel of the mobile network. This embodiment presumes that the mobile device 105 and 110 can be configured to continually record audio. In one embodiment, for example, the mobile device can record a continuous loop and, if a detected sound matches a sound signature 120, the signature detector 115 can prevent that audio from being recorded over until the mobile device either provides the audio to the event processor 125 or determines that the audio is not needed by the event processor 125.

In either case, any information either received by the event processor 125 and/or determined by the event processor 125 can be forwarded to the dispatch center 130 within the notification 170. For example, the notification 170 can indicate the various locations at which mobile devices detected sounds, the sound signatures that were detected, the time at which each sound signature was detected, or the like. If recordings are received by the event processor 125, then recordings can be sent to the dispatch center 130 as well.

In another embodiment, the event processor 125 can provide a summary of the information received from the mobile devices 105 and 110 and/or any determinations that were made in terms of calculating that a valid incident occurred. For example, the event processor 125 can send a particular location to the dispatch center 130 rather than all locations from which a mobile device detected the sound signature 120. In another example, if multiple sound signatures are determined to be related by the event processor 125, a single notification 170 can be sent rather than one for each type of sound signature detected.

The particular information provided from the event processor 125 to the dispatch center 130 is not intended to limit the present invention, as any information collected and/or determined by the event processor can be made available to the dispatch center 130. Once the notification is received by the dispatch center 130, personnel within that center can cause response personnel to be sent or dispatched to a location related to the detected sounds.

Figure 2:
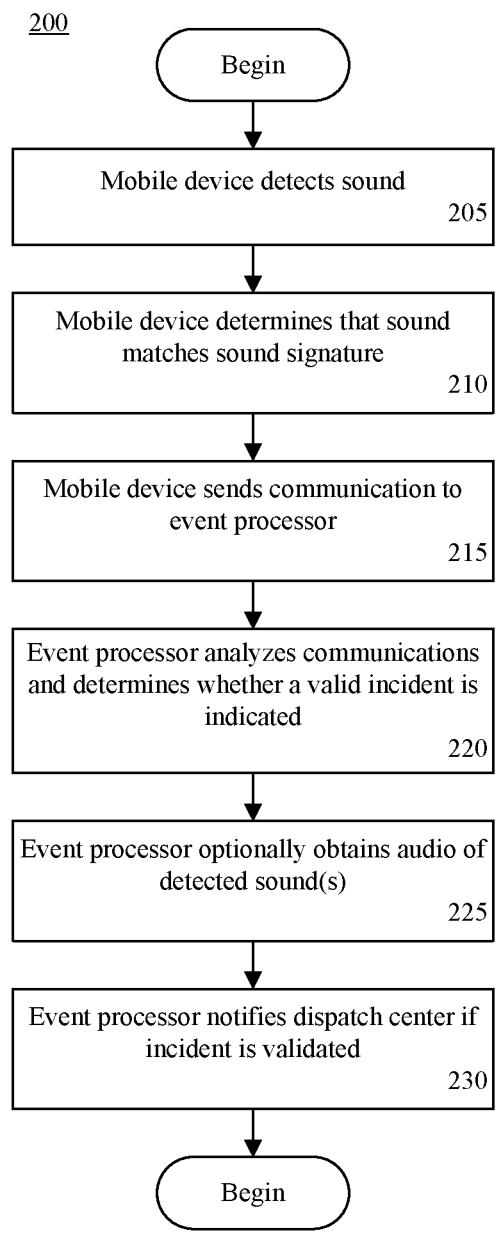
FIG. 2 is a flow chart illustrating a method in accordance with another aspect of the present invention.

FIG. 2 is a flow chart illustrating a method 200 in accordance with another aspect of the present invention. The method 200 can be performed by a system such as the system described with reference to FIG. 1. In step 205, one or more mobile devices can detect a sound through the internal microphone included as part of each respective mobile device.

In step 210, each mobile device can analyze the detected sound and compare the detected sound against one or more sound signatures stored within the mobile device. The mobile device(s) can determine that the sound matches one of the sound signatures stored within the mobile device. In step 215, the mobile device, upon determining that the detected sound matches one of the stored sound signatures, can send a communication to the event processor.

In step 220, the event processor can analyze any communications received from mobile devices. As noted, the event processor can analyze received communications for spatial and temporal proximity, the sort of sound signature indicated within the communications, and the like. The event processor, based upon the analysis of the various messages received from mobile devices, can determine whether a valid incident has been detected. As noted, the data obtained from the communications from the mobile devices can be compared with an incident validation policy to determine whether a valid incident has been detected.

In step 225, the event processor optionally can request audio from one or more of the mobile devices. In one embodiment, audio can be requested from each mobile device from which a communication was received regarding a detected sound. For example, the event processor can request audio from one or more mobile devices as a matter of course. In another aspect, when the event processor cannot determine whether an event is valid from the communications from the mobile devices, the event processor can request audio from one or more mobile devices. In that case, the information specified in the communications is not sufficient to validate the occurrence of an event or is otherwise ambiguous. Obtaining actual audio and subjecting the audio to further analysis can aid the event processor in validating the occurrence of an incident.

In another embodiment, the event processor can select one or more mobile devices from which audio will be requested. For example, the event processor can review information about the detected sound such as the volume and select the mobile device that detected the sound with the greatest volume. The event processor can query that mobile device to send recorded audio of the detected sound under the presumption that the recording will be of better quality than recordings from other mobile devices.

In another aspect, the event processor can request audio from the mobile device that first detected the audio, last detected the audio, or sequentially obtain audio from the mobile devices in chronological order according to the time each respective mobile device detected the sound. Any audio parameter provided by the mobile devices can serve as a means of selecting the particular mobile device from which the recording will be obtained. For example, the communication from each mobile device can indicate the signal-to-noise ratio, background noise levels of the audio environment in which the mobile device is disposed, or other noise information pertaining to the recording of the sound made by that mobile device. For example, the event processor can select the mobile device with the recording considered to be of better fidelity in terms of signal-to-noise, or any other combination or parameters, whether spatial, temporal, or audio quality.

In any case, the recording can be received from the mobile device(s). As noted, the event processor can perform its own analysis and comparison of the detected sound, from the recording(s) furnished by the mobile device(s), with one or more sound signatures. The event processor, for example, can include more robust and/or sophisticated audio analysis software than can reasonably be included or executed in a mobile device.

In step 230, if the event is validated, a notification can be sent to a dispatch center. As noted, personnel in the dispatch center can scramble personnel as may be required to address or respond to the incident.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method for use with a first mobile device having a first microphone and a second mobile device having a second microphone, comprising:
  receiving, by the first mobile device, first audio signature pattern data corresponding to a sound of a gunshot;
  receiving, by the second mobile device, the first audio signature pattern data;
  receiving, by the first mobile device and through the first microphone, a first audio signal that corresponds to a first gunshot audio event;
  receiving, by the second mobile device and through the second microphone, a second audio signal that corresponds to the first gunshot audio event;
  determining, by the first mobile device, that the first audio signal matches the first audio signature pattern data;
  sending, responsive to the determining that the first audio signal matches the first audio signature pattern data, from the first mobile device, over a communication network and to a server, a first communication including information indicative of:
    (i) a time that the first audio signal was received, and
    (ii) a location of the first mobile device at the time the first audio signal was received;
  determining, by the second device, that the second audio signal matches the first audio signature pattern data;

sending, responsive to the determining that the second audio signal matches the first audio signature pattern data, from the second mobile device, over the communication network and to the server, a second communication including information indicative of:
(i) a time that the second audio signal was received, and
(ii) a location of the second mobile device at the time the first audio signal was received;
determining, by the server, that the first communication and the second communication relate to a common gunshot event based upon:
(i) the time that the first audio signal was received as indicated by the first communication, and
(ii) the time that the second audio signal was received as indicated by the second communication; and
triangulating, by the server and responsive to the determining that the first communication and the second communication relate to the common gunshot event, a location of the first gunshot event based upon:
(i) the location of the first mobile device as indicated by the first communication, and
(ii) the location of the second mobile device as indicated by the second communication.

2. The method of claim 1, further comprising communicating, by the server over the communication network and to a device of emergency response personnel, a third communication including information indicative of:
(i) the first gunshot event has occurred, and
(ii) the location of the first gunshot event.

3. A gunshot detection system, comprising:
a first mobile device having a first microphone;
a second mobile device having a second microphone; and
a server connected to the first and second mobile device over a communication network, wherein
the first mobile device is configured to:
   receive a first audio signature pattern data corresponding to a sound of a gunshot,
   receive, through the first microphone, a first audio signal that corresponds to a first gunshot audio event,
   determine that the first audio signal matches the first audio signature pattern data,
   send, responsive to the determining that the first audio signal matches the first audio signature pattern data, over a communication network and to the server, a first communication including information indicative of:
      (i) a time that the first audio signal was received, and
      (ii) a location of the first mobile device at the time the first audio signal was received;
the second mobile device is configured to:
   receive the first audio signature pattern data;
   receive, through the second microphone, a second audio signal that corresponds to the first gunshot audio event;
   determine that the second audio signal matches the first audio signature pattern data;
   sending, responsive to the determining that the second audio signal matches the first audio signature pattern data, over the communication network and to the server, a second communication including information indicative of:
      (i) a time that the second audio signal was received, and
      (ii) a location of the second mobile device at the time the first audio signal was received; and
the server is configured to:
   determine that the first communication and the second communication relate to a common gunshot event based upon:
      (i) the time that the first audio signal was received as indicated by the first communication, and
      (ii) the time that the second audio signal was received as indicated by the second communication; and
   triangulate, responsive to the determining that the first communication and the second communication relate to the common gunshot event, a location of the first gunshot event based upon:
      (i) the location of the first mobile device as indicated by the first communication, and
      (ii) the location of the second mobile device as indicated by the second communication.

4. The system of claim 3, wherein the server is configured to
communicate, over the communication network and to a device of emergency response personnel, a third communication including information indicative of:
(i) the first gunshot event has occurred, and
(ii) the location of the first gunshot event.

* * * * *